(12) United States Patent
Abolafia (10) Patent No.: US 7,983,726 B2
(45) Date of Patent: Jul. 19, 2011

(54) SUPERCONDUCTING GENERATOR

(76) Inventor: Andrew Abolafia, Granville, NY (US)

( * ) Notice: Subject to any disclaimer, the term of this patent is extended or adjusted under 35 U.S.C. 154(b) by 970 days.

(21) Appl. No.: 11/859,247

(22) Filed: Sep. 21, 2007

(65) Prior Publication Data

US 2009/0082208 A1 Mar. 26, 2009

(51) Int. Cl.
*H02K 55/00* (2006.01)
*H02K 21/00* (2006.01)

(52) U.S. Cl. .......... 505/166; 505/876; 505/877; 310/52; 310/216.001; 310/10; 310/112

(58) Field of Classification Search .................. 505/166, 505/876, 877; 310/156.01, 261.1, 216.001, 310/52, 54, 59, 61, 71
See application file for complete search history.

(56) References Cited

U.S. PATENT DOCUMENTS

| | | | |
|---|---|---|---|
| 3,277,322 A | 10/1966 | Berlincourt | |
| 3,292,021 A | 12/1966 | Hoag | |
| 3,415,601 A | 12/1968 | Green | |
| 3,443,128 A | 5/1969 | Fakan | |
| 3,564,307 A | 2/1971 | Kawabe | |
| 3,602,854 A | 8/1971 | Kawabe | |
| 3,673,444 A | 6/1972 | Kawabe et al. | |
| 3,904,901 A | 9/1975 | Renard et al. | |
| 4,237,391 A | 12/1980 | Schur et al. | |
| 4,385,246 A * | 5/1983 | Schur et al. | 310/10 |
| 4,882,509 A | 11/1989 | Wottlin | |
| 5,011,821 A | 4/1991 | McCullough | |
| 5,250,861 A | 10/1993 | Cummins | |
| 5,327,015 A | 7/1994 | Hackett | |
| 5,339,062 A | 8/1994 | Donaldson et al. | |
| 5,710,531 A * | 1/1998 | Abolafia | 335/216 |
| 6,066,906 A | 5/2000 | Kalsi | |
| 6,376,943 B1 * | 4/2002 | Gamble et al. | 310/52 |
| 6,861,770 B2 | 3/2005 | Travers | |
| 7,098,559 B2 | 8/2006 | Travers | |
| 2004/0232792 A1 * | 11/2004 | Erfourth | 310/156.38 |
| 2007/0085427 A1 * | 4/2007 | Sivasubramaniam et al. | 310/52 |

FOREIGN PATENT DOCUMENTS

| | | |
|---|---|---|
| JP | 02211077 A | 8/1990 |
| JP | 2000009022 | 1/2000 |
| JP | 2000/069730 | 3/2000 |
| JP | 2000-069730 * | 3/2000 |
| JP | YP2003294717 | 10/2003 |

* cited by examiner

*Primary Examiner* — Stanley Silverman
*Assistant Examiner* — Kallambella Vijayakumar
(74) *Attorney, Agent, or Firm* — Schmeiser, Olsen & Watts, LLP (57) ABSTRACT

A generator that comprises at least one ferromagnetic core including a gap, a magnet capable of producing a normal magnetic field within said gap and at least one coil positioned within the normal magnetic field on the core. At least one diamagnet that is positioned to pass through said gap on said core, wherein the diamagnet momentarily blocks the normal magnetic field causing a voltage to be induced within said coil.

20 Claims, 8 Drawing Sheets

SUPERCONDUCTING GENERATOR

BACKGROUND OF THE INVENTION

The invention relates to generators.

BRIEF SUMMARY OF THE INVENTION

A first embodiment of the invention is a generator comprising at least one ferromagnetic core including a gap; a magnet positioned on said at least one ferromagnetic core producing a normal magnetic field within said gap; at least one coil positioned within the normal magnetic field on said at least one ferromagnetic core; at least one diamagnet rotatably positioned to pass through said gap on said at least one ferromagnetic core, wherein rotation of said at least one diamagnet that momentarily blocks the normal magnetic field causing a voltage to be produced withing said at least one coil.

A second embodiment of the invention is a superconducting generator comprising: at least one rotatable ferromagnetic core including a gap; a magnet positioned on said at least one ferromagnetic core producing a normal magnetic field; a coil positioned within the field on said at least one ferromagnetic core; and at least one fixed superconducting diamagnet positioned to pass through said gap on said at least one ferromagnetic core when said core is rotated.

A third embodiment of the invention is a superconducting generator comprising: a plurality of ferromagnetic cores arranged in a circle, wherein each core includes a gap; a magnet positioned on each of said plurality of ferromagnetic cores producing a normal magnetic field within each said core and said gap; at least one coil positioned within the normal magnetic field on each said plurality of ferromagnetic cores; a plurality of superconducting diamagnet positioned and configured to pass through each said gap on said plurality of ferromagnetic cores, wherein rotation of either said plurality of superconducting diamagnets or plurality of ferromagnetic cores with respect to each other momentarily blocks the normal magnetic field causing a voltage to be produced withing said at least one coil.

BRIEF DESCRIPTION OF THE DRAWINGS

Some of the embodiments of this invention will be described in detail, with reference to the following figures, wherein like designations denote like members, wherein.

DETAILED DESCRIPTION OF THE INVENTION

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise. In the invention a diamagnet 200, which may be from a superconducting material, acts as a blocking device that moves with respect to a gap 115 in a core 110 having a magnetic field 130 that includes a coil 140, wherein the diamagnet 200 periodically shields and unshields the magnetic field 130 inducing an EMF (Electro Motive Force) generating a voltage or current 195 from the coil 140. The invention provides for the efficient transformation of the energy of the magnetic field 130 into electrical energy from movement of the diamagnet 200 with respect to the gap 115 in the core 110.

Faraday's Law states that the induced emf around a closed mathematical path in a magnetic field is equal to the rate of change of magnetic flux intercepted by the area within the path. Inefficient systems can use large amounts of energy to change the magnetic flux and produce the electromotive force while more efficient methods for changing the flux may be used to produce the same electromotive force for far less energy. Thus, the efficiency in the production of the emf is a product of the efficiency in changing the magnetic flux which passes through the closed circuit.

The blocking of the magnetic field 130 in the core 110 occurs when a diamagnetic object passes through the gap 115, where the diamagnetism is caused by the Meissner effect of superconductive materials (i.e., the diamagnetic properties of a superconductive material 200 may occur in specific materials when operating at a temperature below its transition temperature) that are exploited to provide a device 100 for producing electrical energy from a magnetic field 130. A superconductive element 200, either a high temperature or low temperature type, is maintained at a temperature immediately below its transition temperature or colder and periodically it acts to shield a coil 140 from a magnetic field established by a permanent or electromagnet 120 causing a changing flux within the coil 140 to induce and EMF.

A ferromagnetic core 110 is used that has suitable properties to establish a magnetic field 130 within its body with a magnet 20. The core 110 may be a circular or closed geometric shape, such as a square to allow a continuous magnetic field to be guided. The core 110 can also be made of electrical steel, also called lamination steel, silicon electrical steel, silicon steel or transformer steel, all of which are specialty steels tailored to produce certain magnetic properties, such as a small hysteresis area (small energy dissipation per cycle, or low core loss) and high permeability. The core material 110 may be manufactured in the form of cold-rolled strips less than 2 nm thick called laminations that may form a core 110 when stacked together. Laminations may be cut to their finished shape by a punch and die, or in smaller quantities may be cut by a laser. The core 110 of the instant invention may be shaped in any manner that allows a magnetic loop 130 to be formed within and across the gap 115.

A coil 140 induces an EMF in response to the magnetic field 130 that passes through a gap 115 within the core 110 that is temporarily blocked or disrupted when a diamagnet 200 is interposed between the field of the magnet 120 and the coil 140 by passing within the gap 115 of the core 110. The magnetic field 130 within the core 110 can be from either a permanent or electromagnet 120. The diamagnet 200 is a magnetic flux shielding device that moves with respect to the gap 115 in the core 110 to alternately shield and unshield the magnetic flux from the coil 140. The core 110 as discussed above may be made of a ferro-magnetic material such as transformer steel or the like which would enclose and confine the field of the magnet dipole 120 to ensure that it passes through the gap 115. The invention is not effected by the position of the coil 140 and magnet 120, which may be placed anywhere upon the core 110.

Figure 1:
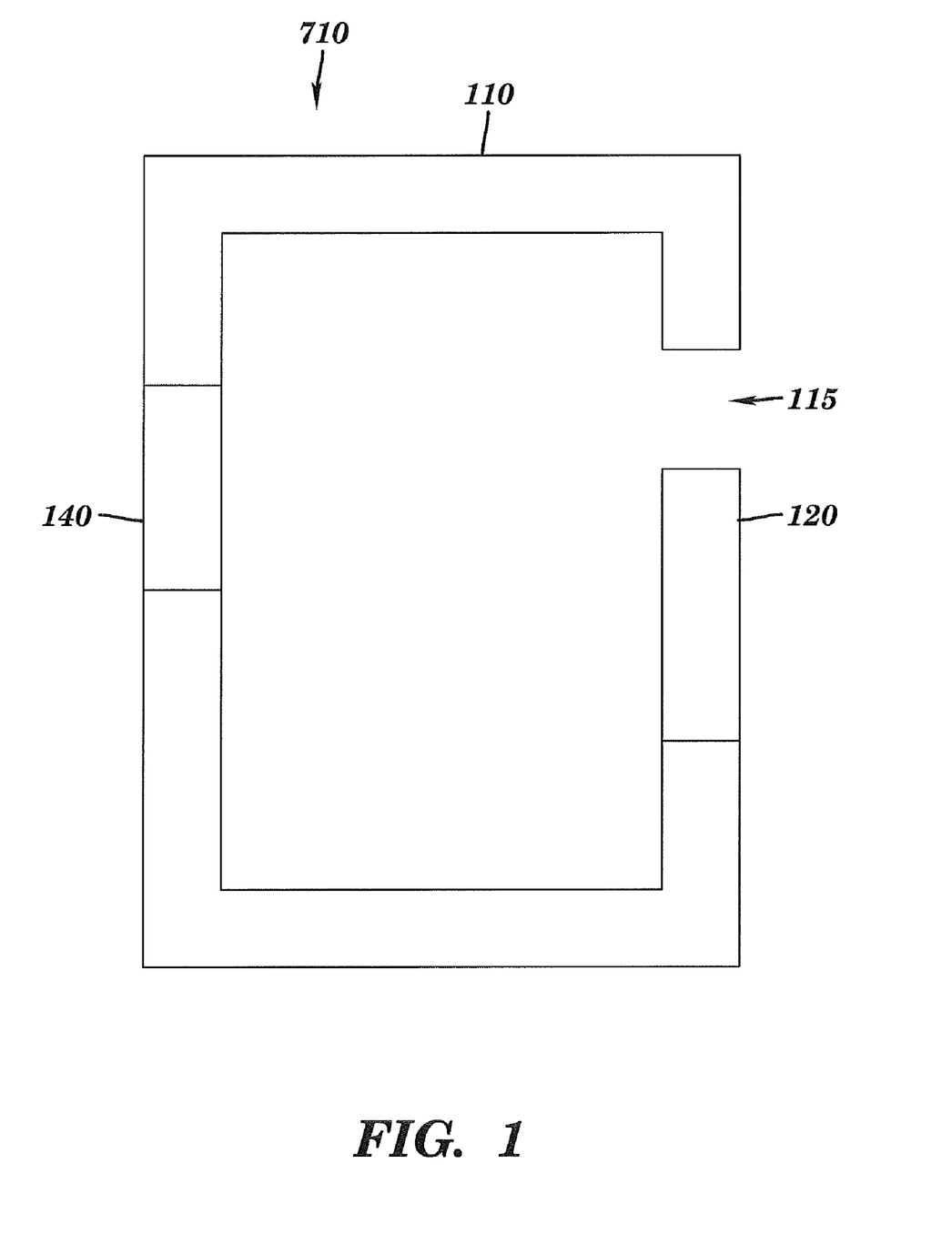
FIG. 1 depicts a side view of the core.
Figure 2:
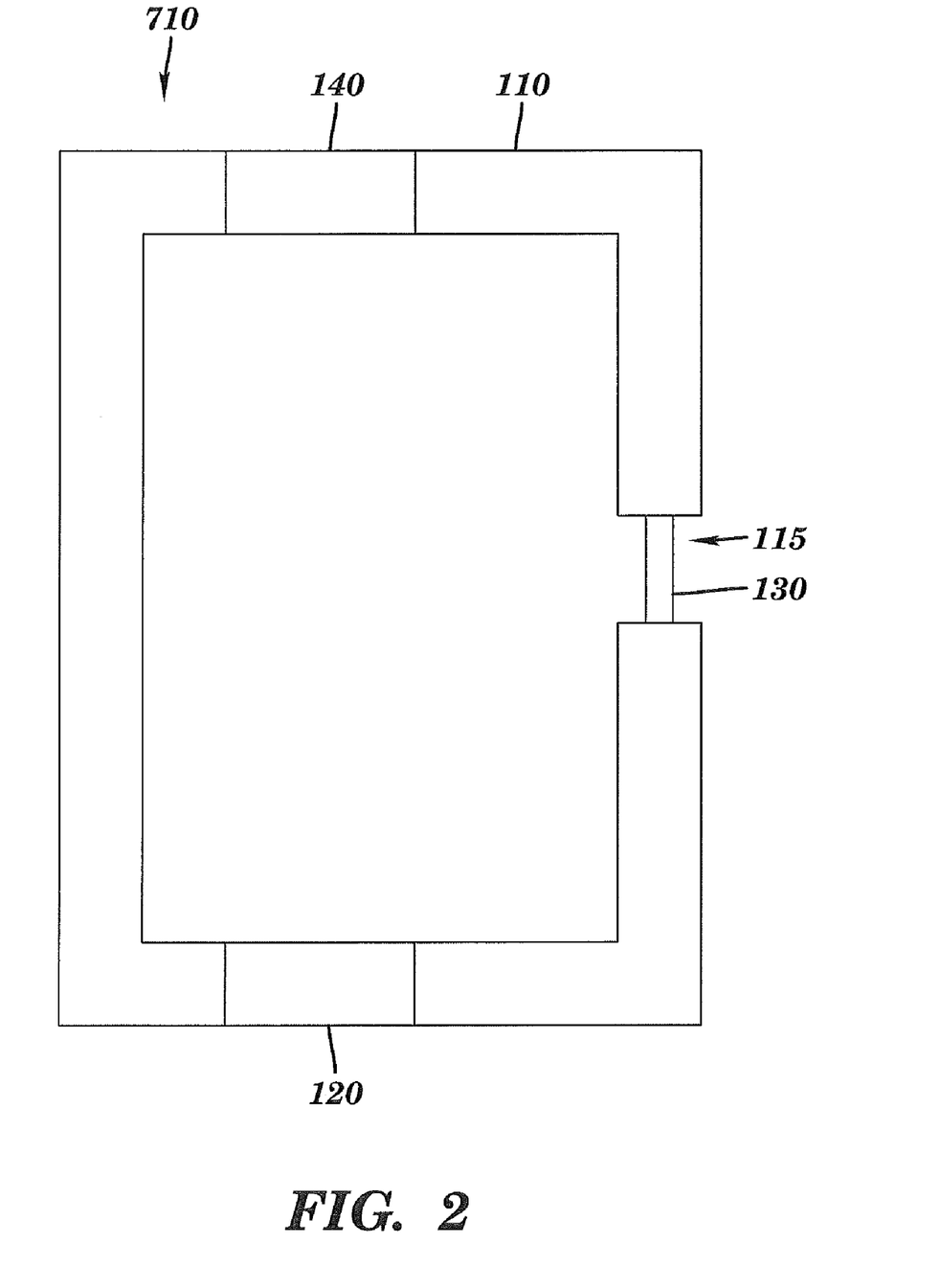
FIG. 2 depicts a side view of a second embodiment of the core.
Figure 4:
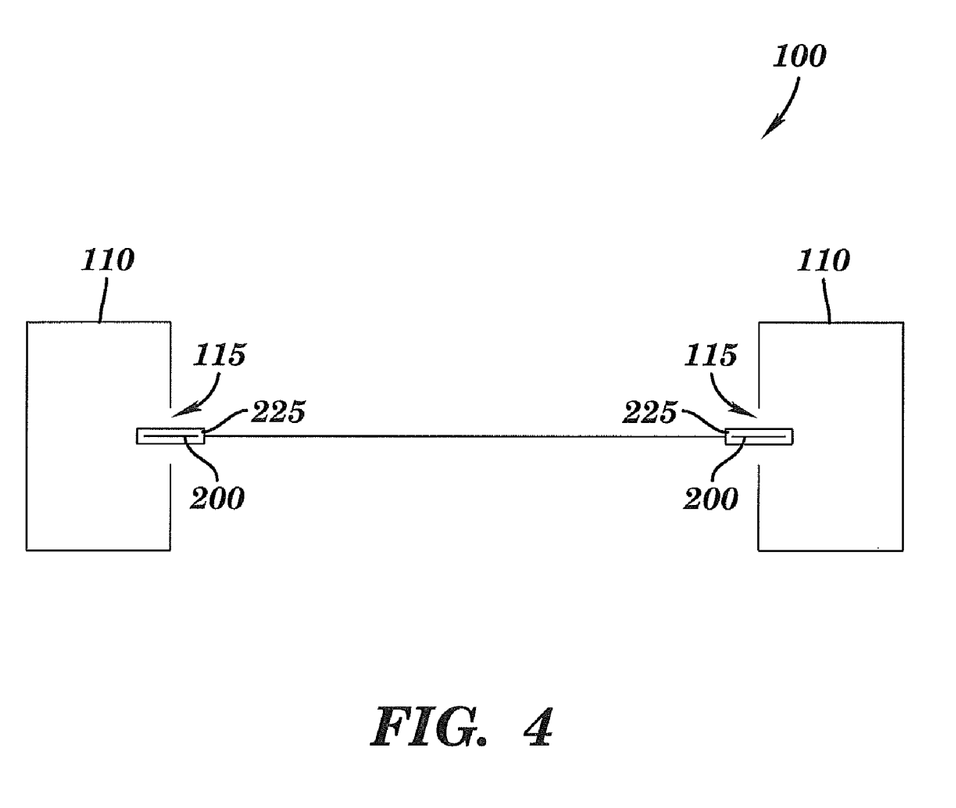
FIG. 4 depicts a plurality of cores with a centrally facing gap and a plurality rotated superconductor.
Figure 5:
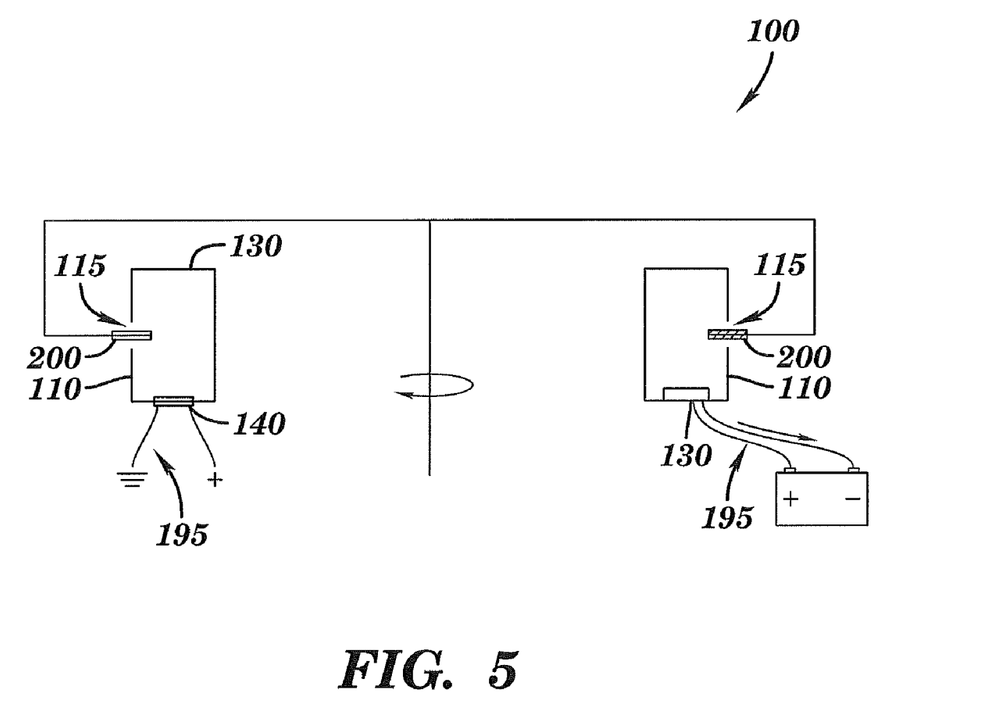
FIG. 5 depicts a plurality of rotating cores with an externally facing gap and a plurality of externally mounted fixed diamagnets.

A superconducting generator 100 of the invention comprises at least one ferromagnetic core 110 including a gap 115 having a magnet 120 positioned on the ferromagnetic core 110 producing a normal magnetic field 130 within said gap 115 and at least one coil 140 positioned within the normal magnetic field 130 on said at least one ferromagnetic core 110 as shown in FIGS. 1 and 2. The superconductor generator 100 includes at least one superconducting diamagnet 200 that is rotatably positioned adjacent to said core 110 to allow the diamagnet 200 to pass through said gap 115 as shown in FIG. 4. An EMF is induced in the coil 140 on the ferromagnetic core 110 when rotation of said at least one superconducting diamagnet 200 momentarily blocks the normal magnetic field 130 causing a changing magnetic flux within at least one coil 140.

Figure 3:
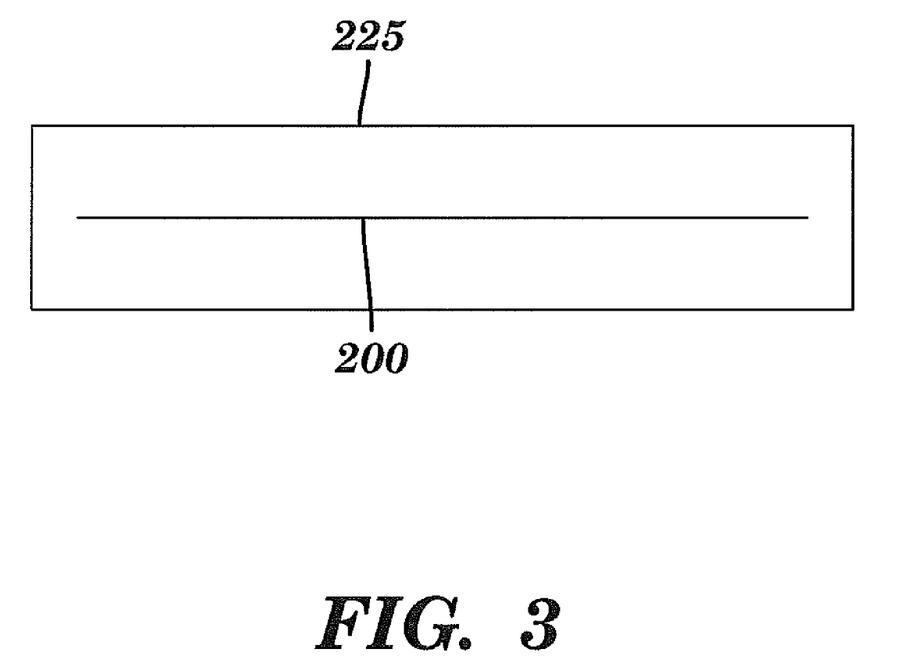
FIG. 3 depicts a diamagnetic superconductor that is optionally encased with a dewar.

The blocking device 200 must be kept below the transition temperature of the specific superconducting material used, either type I or type II or the Meisner effect is temporarily destroyed removing the properties of diamagnetism and therefore preventing blocking of the magnetic field 130 passing through the gap 115. One solution to maintain diamagnetism properties of the superconductor is to cool the whole superconducting apparatus 100 including the core 110, magnet 120 and coil 140 along with the diamagnet 200 and all attached assemblies below the superconducting material's critical temperature used in the application. Another option is by having the superconducting generator 100 further comprise, as shown in FIG. 3, a dewar 225 surrounding said superconducting diamagnet 200, said dewar 225 is dimensioned to pass through the gap 115 on the core 110. The use of a dewar 225 dimensioned to pass within the gap 115 of the core 110 allows for cooling only of the diamagnetic material 200 and the remaining constituents of the generator 100 remain at a more economically desirable temperature above the critical temperature of the superconductor 200 that is desirable from the standpoint of cooling costs and storage requirements.

A superconductor placed in a weak external magnetic field H 130 permits the field 130 to penetrate the superconductor a short distance called the London penetration depth before it decays rapidly to zero (blocked), which is called the Meissner effect, and is a defining characteristic of superconductivity. The Meissner effect is different than the diamagnetism in a perfect electrical conductor that according to Lenz's law, when a changing magnetic field is applied to a conductor, it will induce an electrical current in the conductor that creates an opposing magnetic field. In a perfect conductor, an arbitrarily large current can be induced, and the resulting magnetic field exactly cancels the applied field.

The Meissner effect is distinct from this because a superconductor expels all magnetic fields, not just those that are changing. Suppose we have a material in its normal state, containing a constant internal magnetic field that when the material is cooled below the critical temperature (Tc), we would observe the abrupt expulsion of the internal magnetic field, which we would not expect based on Lenz's law.

The Meissner effect breaks down when the applied magnetic field 130 is too large and thus ceases to be able to function as a diamagnet. Type I superconductors may be abruptly destroyed (superconductivity) when the strength of the applied field rises above a critical value Hc. Depending on the defects and flux pinning of the sample, one may obtain an intermediate state consisting of regions of normal material carrying a magnetic field mixed with regions of superconducting material containing no field. In Type II superconductors, raising the applied field past a critical value $H_{c1}$ leads to a mixed state in which an increasing amount of magnetic flux penetrates the material, but there remains no resistance to the flow of electrical current as long as the current is not too large. At a second critical field strength Hc2, superconductivity is destroyed because the mixed state is actually caused by vortices in the electronic superfluid, sometimes called fluxons because the flux carried by these vortices is quantized. Therefore, the magnetic field 130 in the core 110 of the generator 100 must use a magnetic source 120 weaker than Hc with Type 1 superconductors and weaker than $H_{c1}$ for Type 2 superconductors.

The diamagnet of the invention may be a type 1 superconductors that may require the coldest temperatures to become superconductive and are elemental and very pure in nature. The type 1 superconductors listed below exhibit a very sharp transition to a superconducting state and a "perfect" diamagnetism the ability to repel a magnetic field completely. The instant invention may use the Type 1 superconductor Niobium (Nb) that below a temperature of 8K has an Hc of about 2,000 gauss, which has the highest Hc of the currently known type 1 and type 2 superconductors.

Below is a list of other known Type 1 superconductors along with their critical transition temperature (known as Tc) below which each superconducts. Lead (Pb) 7.196 K; Lanthanum (La) 4.88 K; Tantalum (Ta) 4.47 K; Mercury (Hg) 4.15 K; Tin (Sn) 3.72 K; Indium (In) 3.41 K; Palladium (Pd)* 3.3 K; Chromium (Cr)* 3 K; Thallium (Tl) 2.38 K; Rhenium (Re) 1.697 K; Protactinium (Pa) 1.40 K; Thorium (Th) 1.38 K; Aluminum (Al) 1.175 K; Gallium (Ga)1.083 K; Molybdenum (Mo) 0.915 K; Zinc (Zn) 0.85 K; Osmium (Os)0.66 K; Zirconium (Zr)0.61 K; Americium (Am) 0.60 K; Cadmium (Cd) 0.517 K; Ruthenium (Ru) 0.49 K; Titanium (Ti) 0.40 K; Uranium (U)0.20 K; Hafnium (Hf)0.128 K; Iridium (Ir) 0.1125 K; Beryllium (Be)0.023 K (SRM 768); Tungsten (W)0.0154 K; Platinum (Pt)* 0.0019 K; Lithium (Li)0.0004 K; Rhodium (Rh) 0.000325K.

The next superconducter possible to use is a Type 2 category of superconductors that includes metallic compounds and alloys. The highest Tc attained at ambient pressure for a material that will form stoichiometrically (by formula) has been 138 K and a patent has been applied for a 150K material which does not form stoichiometrically (see below list). Type 2 superconductors differ from Type 1 in that their transition from a normal to a superconducting state is gradual across a region of "mixed state" behavior. A Type 2 will allow some penetration by an external magnetic field into its surface. While there are far too many known to one skilled in the art to list in totality, some of the more interesting Type 2 superconductors are listed below by similarity and with descending Tc's.

One skilled in the art would naturally substitute a later discovered type 2 superconductor having superior properties and higher Tc and should be considered as an equivalent. While type 2 superconductors known currently have a much higher Tc than type 1 superconductors the critical magnetic field is an order of magnitude smaller at about 200 gauss than Niobium (Nb) having 2,000 gauss, which directly impacts the amount of current generated by each coil 140 on each core 110.

A partial list of suitable type 2 superconductors than may be used is as follows: $InSnBa_4Tm_4Cu_6O_{18+}$~150 K; $(Hg_{0.8}Tl_{0.2})Ba_2Ca_2Cu_{38.33}$ 138K; $HgBa_2Ca_2Cu_3O_8$ 133-135K; $HgBa_2Ca_3Cu_4O_{10+}$ 125-126K; $HgBa_2(Ca_{1-x}Sr_x)Cu_2O_{6+}$ 123-125K; $HgBa_2CuO_4+$ 94-98K; $Tl_2Ba_2Ca_2Cu_3O_{10}$ 127-128K; $(Tl_{1.6}Hg_{0.4})Ba_2Ca_2Cu_3O_{10+}$ 123K; $TlBa_2Ca_2Cu_3O_{9+}$ 118-120K; $(Tl_{0.5}Pb_{0.5})Sr_2Ca_2Cu_3O_9$ 118K; $Tl_2Ba_2CaCu_2O_6$ 115K; $(Tl_{0.5}Sn_{0.5})Ba_2(Ca_{0.5}Tm_{0.5})Cu_2O_x$ 112K; $TlBa_2Ca_3Cu_4O_{11}$ 103K; $TlBa_2CaCu_2O_{7+}$ 95K; $Sn_2Ba_2(Ca_{0.5}Tm_{0.5})Cu_3O_{8+}$ 115K; $SnInBa_4Tm_3Cu_5O_x$ 113K; $Sn_3Ba_4Tm_3Cu_6O_x$ 109K; $Sn_3Ba_8Ca_4Cu_{11}O_x$ 109K; $SnBa_4Y_2Cu_5O_x$ 105K; $Sn_4Ba_4Tm_2YCu_7O_x$ 104K; $Sn_4Ba_4CaTmCu_4O_x$ 100K; $Sn_4Ba_4Tm_3Cu_7O_x$ 98K; $Sn_2Ba_2(Y_{0.5}Tm_{0.5})Cu_3O_{8+}$ 96K; $Sn_3Ba_4Y_2Cu_5O_x$ 91K; $SnInBa_4Tm_4Cu_6O_x$ 87K; $Sn_2Ba_2(Sr_{0.5}Y_{0.5})Cu_3O_8$ 80K; $Sn_4Ba_4Y_3Cu_7O_x$ 80K; $Bi_{1.6}Pb_{0.6}Sr_2Ca_2Sb_{0.1}Cu_3O_y$ 115K; $Bi_2Sr_2Ca_2Cu_3O_{10}$ 110K; $Bi_2Sr_2CaCu_2O_9$ 110K; $Bi_2Sr_2(Ca_{0.8}Y_{0.2})Cu_2O_8$ 95-96K; $Bi_2Sr_2CaCu_2O_8$ 91-92K; $(Ca_{1-x}Sr_x)CuO_2$ 110K; $YSrCa_2Cu_4O_{8+}$ 101K; (Ba,Sr)$CuO_2$ 90K; $BaSr_2CaCu_4O_{8+}$ 90K; (La,Sr)$CuO_2$ 42K; $Pb_3Sr_4Ca_3Cu_6O_x$ 106K; $Pb_3Sr_4Ca_2Cu_5O_{15+}$ 101K; $(Pb_{1.5}Sn_{1.5})Sr_4Ca_2Cu_5O_{15+}$ 95K; $Pb_2Sr_2(Ca,Y)Cu_3O_8$ 70K; $AuBa_2Ca_3Cu_4O_{11}$ 99K; $AuBa_2(Y,Ca)Cu_2O_7$ 82K; $AuBa_2Ca_2Cu_3O_9$ 30K; $(Y_{0.5}Lu_{0.5})Ba_2Cu_3O_7$ 107K; $(Y_{0.5}Tm_{0.5})Ba_2Cu_3O_7$ 105K; $(Y_{0.5}Gd_{0.5})Ba_2Cu_3O_7$ 97K; $Y_2CaBa_4Cu_7O_{16}$ 97K; $Y_3Ba_4Cu_7O_{16}$ 96K; $NdBa_2Cu_3O_7$ 96K; $Y_2Ba_4Cu_7O_{15}$ 95K; $GdBa_2Cu_3O_7$ 94K; $YBa_2Cu_3O_7$ 92K; $TmBa_2Cu_3O_7$ 90K; $YbBa_2Cu_3O_7$ 89K; $YSr_2Cu_3O_7$ 62K; $GaSr_2(Ca_{0.5}Tm_{0.5})Cu_2O_7$ 99K; $Ga_2Sr_4Y_2CaCu_5O_x$ 85K; $Ga_2Sr_4Tm_2CaCu_5O_x$ 81K; $La_2Ba_2CaCu_5O_{9+}$ 79K; (Sr,Ca)$_5Cu_4O_{10}$ 70K; $GaSr_2(Ca,Y)Cu_2O_7$ 70K; $(In_{0.3}Pb_{0.7})Sr_2(Ca_{0.8}Y_{0.2})Cu_2O_x$ 60K; (La,Sr,Ca)$_3Cu_2O_6$ 58K; $La_2CaCu_2O_{6+}$ 45K; $(Eu,Ce)_2(Ba,Eu)_2Cu_3O_{10+}$ 43K; $(La_{1.85}Sr_{0.15})CuO_4$ 40K; SrNdCuO 40K; (La,Ba)$_2CuO_4$ 35-38K; (Nd,Sr,Ce)$_2CuO_4$ 35K; $Pb_2(Sr,La)_2Cu_2O_6$ 32K; $(La_{1.85}Ba_{0.15})CuO_4$ 30K; $MgB_2$ 39K; $Ba_{0.6}K_{0.4}BiO_3$ 30K; $Nb_3Ge$ 23.2K; $Nb_3Si$ 19K; $Nb_3Sn$ 18.1K; $Nb_3Al$ 18K; $V_3Si$17.1K; $Ta_3Pb$ 17K; $V_3Ga$ 16.8K; $Nb_3Ga$ 14.5K; $V_3In$ 13.9K; $PuCoGa_5$ 18.5K; NbN 16.1K; and many others.

Figure 7:
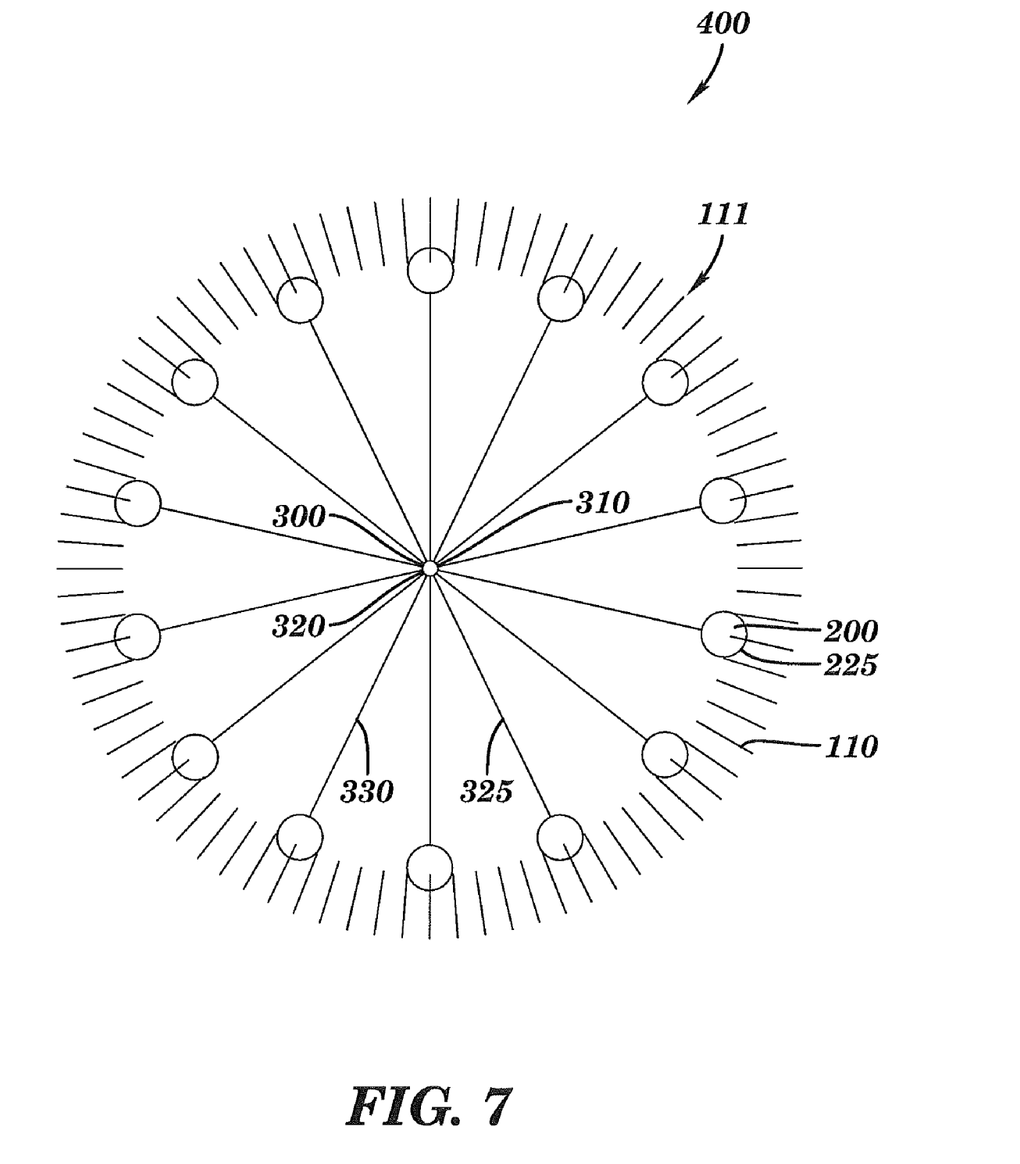
FIG. 7 depicts a top view of a plurality of diamagnets rotated within a circular formation of inwardly facing cores.

The superconducting generator 100 of FIG. 7 may further comprise a rotatable carrier 300, wherein said at least one superconducting diamagnet 200 is mounted thereupon. A coolant 325 may be provided to the superconducting diamagnets 200 to prevent transition to the normal state through supports including circulating conduits 330. The superconducting generator 100 further comprises a rotatable shaft 310 connected to said rotatable carrier 300, wherein said rotatable shaft contains ducts 320 to circulate said coolant 325. In addition to the coolant circulation 325 an insulating member 225 may surround said at least one superconducting diamagnet 200 to maintain a temperature sufficient to maintain superconductivity through proving insulation.

The superconducting generator 100 includes a magnet 120 on each core 110 that may either be a permanent magnet or an electromagnet. The magnet 120 is selected to produce a field strength below the critical field strength (saturation point) of the selected superconductor, which is about 200 gauss for a Type 2 superconductor. The superconducting generator 400 of FIG. 7 shows an embodiment of a device 400 with an arrangement of a plurality of cores 111 that allows increased electrical higher output while using a higher temperature Type 2 superconductor 200 having an Hc of 200 gauss or less wherein a plurality of ferromagnetic cores 111 are arranged in a circle, wherein said gap 115 faces inwards. A plurality of rotatable carriers 330 each having at least one superconducting diamagnet 200 is mounted thereupon in a circularly spaced fashion to allow rotation. The amount of diamagnets 200 and cores 111 present are determined by the rotational force (torque) provided to a rotatable shaft 310 connected to said plurality of rotatable carriers 330. The plurality of ferromagnetic cores 111 are arranged in a circle forming a ring of magnetic fields 131, wherein each of said plurality of rotatable carriers 200 rotates within said ring of magnetic fields 131 by passing through the gap 115. The number of cores, and diamagnets are determined by the torque input, desired output, the strength of the diamagnet that determine individual field strength that directly correlates to individual coil outputs and required operating temperature.

Figure 6:
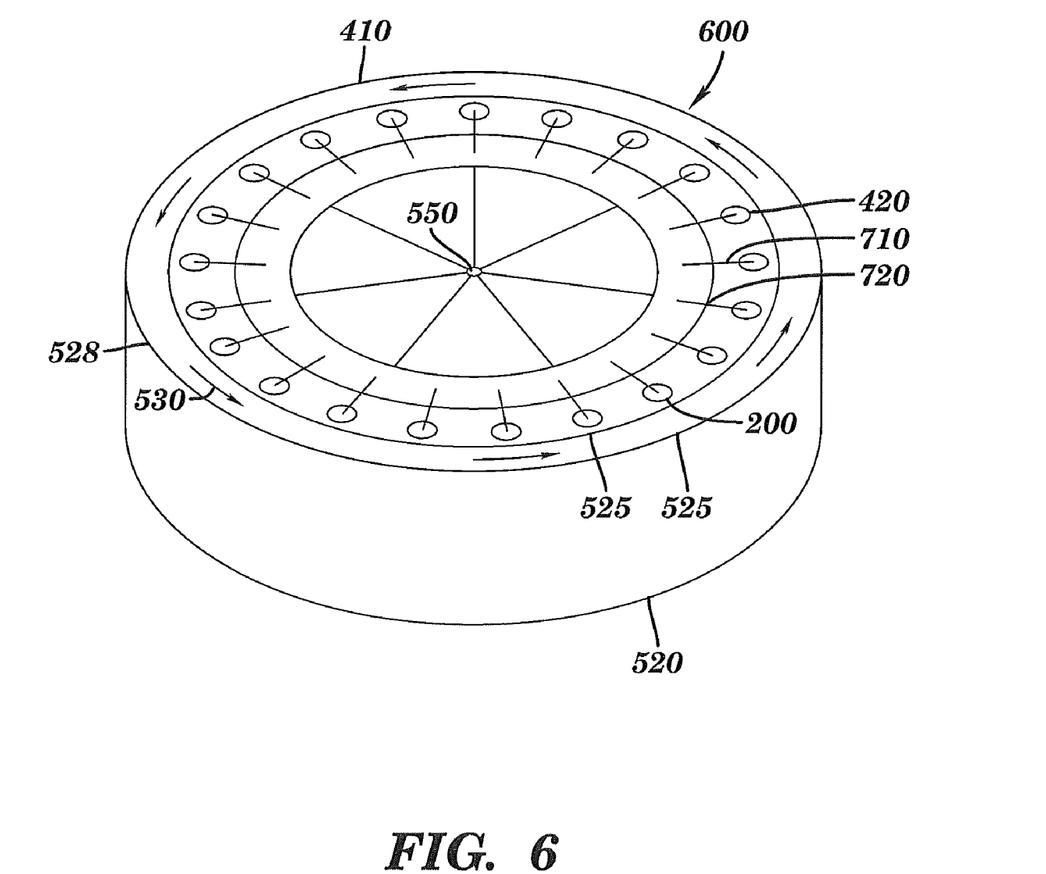
FIG. 6 depicts a top view of a plurality of cores arranged in a circular pattern that are rotated to move fixed diamagnets within that gap.

Another embodiment of the superconducting generator 500 as shown in FIG. 6 comprises at least one rotatable ferromagnetic core 110, 710 including a gap 115 having a magnet 120 positioned on said ferromagnetic core 110 producing a normal magnetic field 130. A coil 140 is positioned within the field 130 on each ferromagnetic core 110, 710. The core 110 is rotated in relation to at least one fixed superconducting diamagnet 200 that is positioned to pass through said gap 115 on said at least one ferromagnetic core 110, 710 when said core 110 is rotated.

The superconducting generator 600 may further comprising a positioning member 410, wherein a plurality of superconducting diamagnets 420 are mounted thereupon in a circularly spaced fashion. A plurality of ferromagnetic cores 710 arranged in a circle forming a ring of parallel magnetic fields 720, wherein said ring of parallel magnetic fields 720 is rotated so that said plurality of superconducting diamagnets 420 on the positioning member blocks said ring of parallel magnetic fields 720 during rotation.

The superconducting generator 600 of FIG. 6 further comprises a vessel 520 having a wall 525 that may include insulation 528 and cryogen 530 therein circulating to cool the plurality of superconducting diamagnets 200 that are mounted to extend therefrom in a circularly spaced fashion on said wall 525 of said vessel 520. A rotatable shaft 550 is operably attached to a plurality of ferromagnetic cores 710 arranged in a circle. The plurality of cores 710 are not in physical or electrical contact so as to form a ring of parallel magnetic fields 730 that are mounted to said rotatable shaft 550. The plurality of ferromagnetic cores 710 have said gap 115 facing outwards and is positioned within said vessel 520 so that said diamagnets 200 on said vessel wall 525 momentarily blocks said fields 730 during rotation when passing within said gap 115. The superconducting generator 600 may include a cryogen or cryogenic refrigeration 530 within said vessel wall 525 to chill said attached, affixed or partially embedded superconducting diamagnets 200 to allow the plurality of ferromagnetic cores 710 to be maintained at a temperature above a critical superconducting temperature.

The dewar 225 as shown in FIG. 3 may be made of glass, stainless steel or any other material that does not have magnetic or electric properties at the low required temperatures below the Tc of the superconductor 200. The shape of the superconductor 200 within the dewar 225 can be modified to adjust the output waveform of the coil 140. The diamagnet shape 202 may be changed to a circular shape, square, rectangular, or rod like to create a square, triangular or sinusoidal wave pattern from said EMF output of said coil 140.

Figure 8:
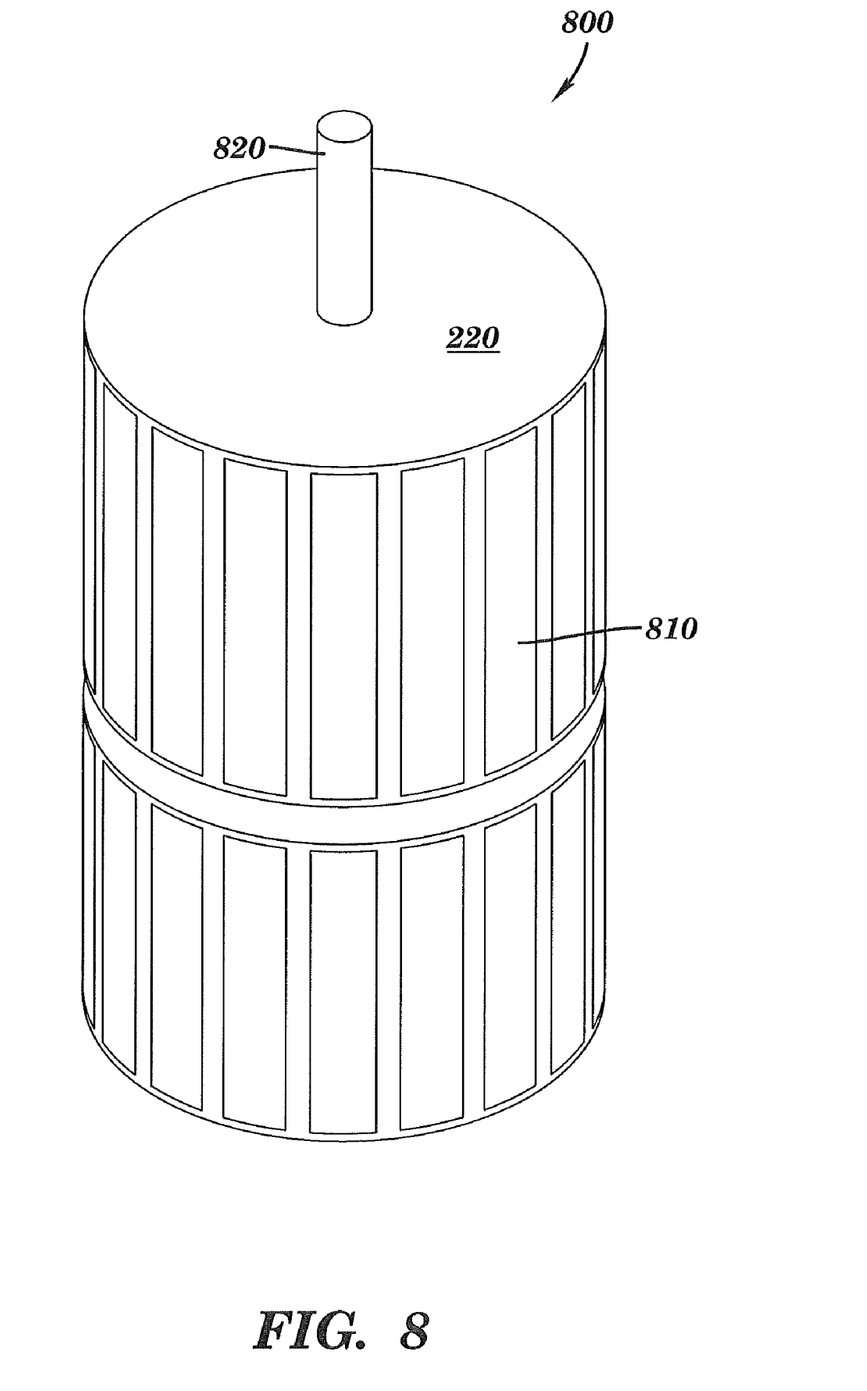
FIG. 8 depicts a side view of a stacked circular arrangement of cores and diamagnets.

A superconducting generator 800 as shown in FIG. 8 comprises a plurality of ferromagnetic cores 810 arranged in a circle, wherein each core as shown in FIG. 1 includes a gap 115 and a magnet 120 that produces a normal magnetic field 130 within each core 110 and across the gap 115. There is at least one coil 140 positioned within the normal magnetic field 130 on each ferromagnetic core. The plurality of cores arranged in a circle 810 may be stacked upon each other and share a common rotation shaft 820 that can be configured to rotate either the plurality of cores arranged in a circle 810 or a plurality of superconducting diamagnets 220 positioned and configured to pass through each said gap 115 on said plurality of ferromagnetic cores 810. The rotation of the shaft 820 depending on the desired configuration allows movement of either said plurality of superconducting diamagnets 220 or plurality of ferromagnetic cores 810 with respect to each other to momentarily block the normal magnetic field 130 causing a voltage to be produced within said at least one coil 140.

Various modifications and variations of the described apparatus and methods of the invention will be apparent to those skilled in the art without departing from the scope and spirit of the invention. Although the invention has been described in connection with specific embodiments, outlined above, it should be understood that the invention should not be unduly limited to such specific embodiments. Various changes may be made without departing from the spirit and scope of the invention as defined in the following claims.

I claim:

1. A generator comprising:
   at least one ferromagnetic core including a gap;
   a magnet positioned on said at least one ferromagnetic core producing a normal magnetic field within said gap;
   at least one coil positioned within the normal magnetic field on said at least one ferromagnetic core;
   at least one superconducting diamagnet rotatably positioned to pass through said gap on said at least one ferromagnetic core, wherein rotation of said at least one diamagnet momentarily blocks the normal magnetic field causing a voltage to be produced withing said at least one coil.

2. The generator of claim 1 further comprising:
   a dewar surrounding said diamagnet, said dewar dimensioned to pass through said gap.

3. The generator of claim 1 further comprising:
   a rotatable carrier, wherein said at least one diamagnet is mounted thereupon; and
   a frictionless bearing mounted on said rotatable carrier.

4. The generator of claim 1 further comprising:
   a rotatable shaft connected to said rotatable carrier, wherein said rotatable shaft contains ducts to circulate a cryogen.

5. The generator of claim 1 further comprising:
   an insulating member surrounding said at least one diamagnet to maintain a temperature sufficient to maintain superconductivity.

6. The generator of claim 1 wherein the magnet is a permanent magnet.

7. The generator of claim 1 wherein the magnet is an electromagnet.

8. The generator of claim 1 wherein said at least one ferromagnetic core is a plurality of ferromagnetic cores arranged in a circle, wherein said gap faces inwards.

9. The generator of claim 1 further comprising:
   a plurality of rotatable carriers, wherein a plurality of said at least one diamagnet is mounted thereupon in a circularly spaced fashion;
   a rotatable shaft connected to said plurality of rotatable carriers; and
   a plurality of ferromagnetic cores arranged in a circle forming a ring of magnetic fields, wherein each of said plurality of rotatable carriers rotates within said ring of magnetic fields within said gap.

10. A superconducting generator comprising:
    at least one rotatable ferromagnetic core including a gap;
    a magnet positioned on said at least one ferromagnetic core producing a normal magnetic field;
    a coil positioned within the field on said at least one ferromagnetic core; and
    at least one fixed superconducting diamagnet positioned to pass through said gap on said at least one ferromagnetic core when said core is rotated.

11. The superconducting generator of claim 10 further comprising:
    a dewar surrounding said superconducting diamagnet, said dewar dimensioned to pass through said gap.

12. The superconducting generator of claim 10 further comprising:
    a positioning member, wherein a plurality of said at least one superconducting diamagnet is mounted thereupon in a circularly spaced fashion; and
    a plurality of ferromagnetic cores arranged in a circle forming a ring of parallel magnetic fields, wherein said ring of parallel magnetic fields is rotated so that said plurality of said at least one superconducting diamagnet on the positioning member blocks said ring of parallel magnetic fields during rotation.

13. The superconducting generator of claim 11 wherein said gap of said at least one rotatable ferromagnetic core faces inward.

14. The superconducting generator of claim 10 further comprising:
    a vessel having a wall;
    a plurality of said at least one superconducting diamagnet is mounted to extend therefrom in a circularly spaced fashion on said wall of said vessel;
    a rotatable shaft; and
    a plurality of ferromagnetic cores arranged in a circle and forming a ring of parallel magnetic fields that are mounted to said rotatable shaft, wherein said plurality of ferromagnetic cores have said gap facing outwards and is positioned within said vessel so that said diamagnets on said vessel wall blocks said fields during rotation.

15. The superconducting generator of claim 14 further comprising:
    a fluid within said vessel wall to chill said at least one superconducting diamagnet.

16. The superconducting generator of claim 15 wherein said plurality of ferromagnetic cores is placed into a stacked configuration.

17. The superconducting generator of claim 10 wherein the diamagnet shape may be changed to create a different wave pattern from said coil.

18. A generator comprising:
    a plurality of ferromagnetic cores, wherein each core includes a gap;
    a magnet positioned on each of said plurality of ferromagnetic cores producing a normal magnetic field within each said core and said gap;
    at least one coil positioned within the normal magnetic field on each said plurality of ferromagnetic cores;
    a plurality of diamagnets positioned and configured to pass through each said gap on said plurality of ferromagnetic cores, wherein rotation of either said plurality of diamagnets or plurality of ferromagnetic cores with respect to each other momentarily blocks the normal magnetic field causing a voltage to be produced withing said at least one coil.

19. The generator of claim 18 wherein the diamagnet is selected from the group consisting of Niobium, $YBa_2Cu_3O_7$, $YBa_2Cu_4O_8$, or $Y_2Ba_4Cu_7O_{14}$.

20. The generator of claim 18 wherein said diamagnet has a shape selected from the group consisting of circular, square, polygon, rod or rectangular.

* * * * *

UNITED STATES PATENT AND TRADEMARK OFFICE
CERTIFICATE OF CORRECTION

PATENT NO. : 7,983,726 B2  
APPLICATION NO. : 11/859247  
DATED : July 19, 2011  
INVENTOR(S) : Andrew Abolafia Page 1 of 1

It is certified that error appears in the above-identified patent and that said Letters Patent is hereby corrected as shown below:

in column 1, line 17, "withing" should read --within--;  
    in column 1, line 37, "withing" should read --within--;  
    in column 7, line 38, "withing" should read --within--;  
    in column 9, line 2, "withing" should read --within--.

Signed and Sealed this  
Twenty-seventh Day of September, 2011

David J. Kappos  
*Director of the United States Patent and Trademark Office*